(12) United States Patent
Suciu et al.

(10) Patent No.: US 10,330,010 B2
(45) Date of Patent: Jun. 25, 2019

(54) COMPRESSOR CORE INNER DIAMETER COOLING

(71) Applicant: United Technologies Corporation, Farmington, CT (US)

(72) Inventors: Gabriel L. Suciu, Glastonbury, CT (US); Brian D. Merry, Andover, CT (US); Jesse M. Chandler, South Windsor, CT (US); William K. Ackermann, East Hartford, CT (US); Matthew R. Feulner, West Hartford, CT (US); Om P. Sharma, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 683 days.

(21) Appl. No.: 14/967,518

(22) Filed: Dec. 14, 2015

(65) Prior Publication Data
US 2017/0167384 A1    Jun. 15, 2017

(51) Int. Cl.
*F02C 7/18* (2006.01)
*F02C 7/143* (2006.01)
(Continued)

(52) U.S. Cl.
CPC .................. *F02C 7/18* (2013.01); *F01D 5/08* (2013.01); *F02C 3/04* (2013.01); *F02C 7/143* (2013.01); *F02C 7/185* (2013.01); *F02C 9/18* (2013.01); *F02K 3/06* (2013.01); *F04D 29/5826* (2013.01); *F05D 2220/32* (2013.01); *F05D 2220/3219* (2013.01); *F05D 2240/24* (2013.01);
(Continued)

(58) Field of Classification Search
CPC .... F02C 7/18; F02C 7/185; F02C 9/18; F02C 7/143; F01D 25/12; F01D 25/125; F01D 5/081; F01D 5/082; F01D 5/084; F01D 5/085
See application file for complete search history.

(56) References Cited

U.S. PATENT DOCUMENTS

| 5,209,633 A | 5/1993 | McGreehan et al. |
| 5,292,227 A | 3/1994 | Czachor et al. |

(Continued)

FOREIGN PATENT DOCUMENTS

| EP | 0608142 A1 | 7/1994 |
| EP | 2527603 A2 | 11/2012 |
| GB | 1095129 A | 12/1967 |

OTHER PUBLICATIONS

European Search Report for European Application No. 16203857.4 dated May 11, 2017.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A compressor section for use in a gas turbine engine comprises a compressor rotor having a hub and a plurality of blades extending radially outwardly from the hub and an outer housing surrounding an outer periphery of the blades. A tap taps air at a radially outer first location, passing the tapped air through a heat exchanger, and returning the tapped air to an outlet at a second location which is radially inward of the first location, to provide cooling air adjacent to the hub. A gas turbine engine is also disclosed.

18 Claims, 7 Drawing Sheets

(51) Int. Cl.
  *F02C 9/18* (2006.01)
  *F02C 3/04* (2006.01)
  *F02K 3/06* (2006.01)
  *F01D 5/08* (2006.01)
  *F04D 29/58* (2006.01)
(52) U.S. Cl.
  CPC .. *F05D 2260/205* (2013.01); *F05D 2260/211* (2013.01); *F05D 2260/213* (2013.01)

(56) References Cited

U.S. PATENT DOCUMENTS

| | | | |
|---|---|---|---|
| 5,297,386 A | 3/1994 | Kervistin | |
| 5,317,877 A * | 6/1994 | Stuart | F02C 7/185 |
| | | | 60/736 |
| 5,327,719 A * | 7/1994 | Mazeaud | F01D 5/087 |
| | | | 415/115 |
| 5,392,614 A * | 2/1995 | Coffinberry | F02C 7/12 |
| | | | 60/806 |
| 5,414,992 A | 5/1995 | Glickstein | |
| 6,050,080 A | 4/2000 | Horner | |
| 6,134,880 A | 10/2000 | Yoshinaka | |
| 6,612,114 B1 | 9/2003 | Klingels | |
| 6,722,138 B2 | 4/2004 | Soechting et al. | |
| 7,124,590 B2 | 10/2006 | Hoff et al. | |
| 7,162,876 B2 | 1/2007 | Hoff et al. | |
| 8,256,229 B2 | 9/2012 | Glahn et al. | |
| 8,459,040 B2 | 6/2013 | Glahn et al. | |
| 2008/0310955 A1 | 12/2008 | Norris et al. | |
| 2009/0044543 A1* | 2/2009 | Clemen | F02C 6/08 |
| | | | 60/785 |
| 2009/0196736 A1* | 8/2009 | Sengar | F01D 11/04 |
| | | | 415/115 |
| 2013/0192253 A1 | 8/2013 | Ackermann et al. | |
| 2017/0159568 A1* | 6/2017 | Sennoun | F04D 29/5826 |

* cited by examiner

COMPRESSOR CORE INNER DIAMETER COOLING

BACKGROUND OF THE INVENTION

This application relates to providing cooling air to an inner diameter of a gas turbine engine compressor.

Gas turbine engines are known and typically include a fan delivering air into a bypass duct as propulsion air. In addition, the fan delivers air into a compressor section. The air is compressed in the compressor and delivered into a combustor where it is mixed with fuel and ignited. Products of this combustion pass downstream over turbine rotors driving them to rotate. The turbine rotors, in turn, drive the fan and compressor rotors.

There are a number of challenges with regard to the design of a gas turbine. For many reasons, it would be desirable to have the air leaving the final stage of the compressor be at a high temperature and high pressure. However, this desire is countered by physical limitations of the compressor hub at that location.

SUMMARY OF THE INVENTION

In a featured embodiment, a compressor section for use in a gas turbine engine comprises a compressor rotor having a hub and a plurality of blades extending radially outwardly from the hub and an outer housing surrounding an outer periphery of the blades. A tap taps air at a radially outer first location, passing the tapped air through a heat exchanger, and returning the tapped air to an outlet at a second location which is radially inward of the first location, to provide cooling air adjacent to the hub.

In another embodiment according to the previous embodiment, the outlet is at a location which is upstream of the tap.

In another embodiment according to any of the previous embodiments, there is a lower pressure compressor rotor and a higher pressure compressor rotor, and the tap is within the higher pressure compressor rotor.

In another embodiment according to any of the previous embodiments, the outlet is at a location which is downstream of the tap.

In another embodiment according to any of the previous embodiments, the compressor section includes a lower pressure compressor rotor and a higher pressure compressor rotor, and the tap is taken at a location which is upstream of the higher pressure compressor rotor.

In another embodiment according to any of the previous embodiments, a fan drives air downstream of the heat exchanger to the outlet.

In another embodiment according to any of the previous embodiments, the tap is taken in a duct position intermediate a lower pressure compressor rotor and a higher pressure compressor rotor.

In another embodiment according to any of the previous embodiments, the tap is taken in a duct position intermediate a lower pressure compressor rotor and a higher pressure compressor rotor.

In another embodiment according to any of the previous embodiments, the outlet is also in the duct.

In another featured embodiment, a gas turbine engine comprises a compressor section, a combustor, and a turbine section. The compressor section includes a compressor rotor having a hub and a plurality of blades extending radially outwardly from the hub and an outer housing surrounding an outer periphery of the blades. A tap taps air at a radially outer first location, passes the tapped air through a heat exchanger, and returns the tapped air to an outlet at a second location which is radially inward of the first location, to provide cooling air adjacent to the hub.

In another embodiment according to the previous embodiment, the outlet is at a location which is upstream of the tap.

In another embodiment according to any of the previous embodiments, there is a lower pressure compressor rotor and a higher pressure compressor rotor, and the tap is within the high pressure compressor rotor.

In another embodiment according to any of the previous embodiments, the outlet is at a location which is downstream of the tap.

In another embodiment according to any of the previous embodiments, the compressor section includes a lower pressure compressor rotor and a higher pressure compressor rotor, and the tap is taken at a location which is upstream of the higher pressure compressor rotor.

In another embodiment according to any of the previous embodiments, a fan drives air downstream of the heat exchanger to the outlet.

In another embodiment according to any of the previous embodiments, the tap is taken in a duct position intermediate a lower pressure compressor rotor and a higher pressure compressor rotor.

In another embodiment according to any of the previous embodiments, the tap is taken in a duct position intermediate a lower pressure compressor rotor and a higher pressure compressor rotor.

In another embodiment according to any of the previous embodiments, the outlet is also in the duct.

In another embodiment according to any of the previous embodiments, the tap is taken in a duct position intermediate a lower pressure compressor rotor and a higher pressure compressor rotor.

In another embodiment according to any of the previous embodiments, the outlet is also in the duct.

These and other features may be best understood from the following drawings and specification.

DETAILED DESCRIPTION

Figure 1:
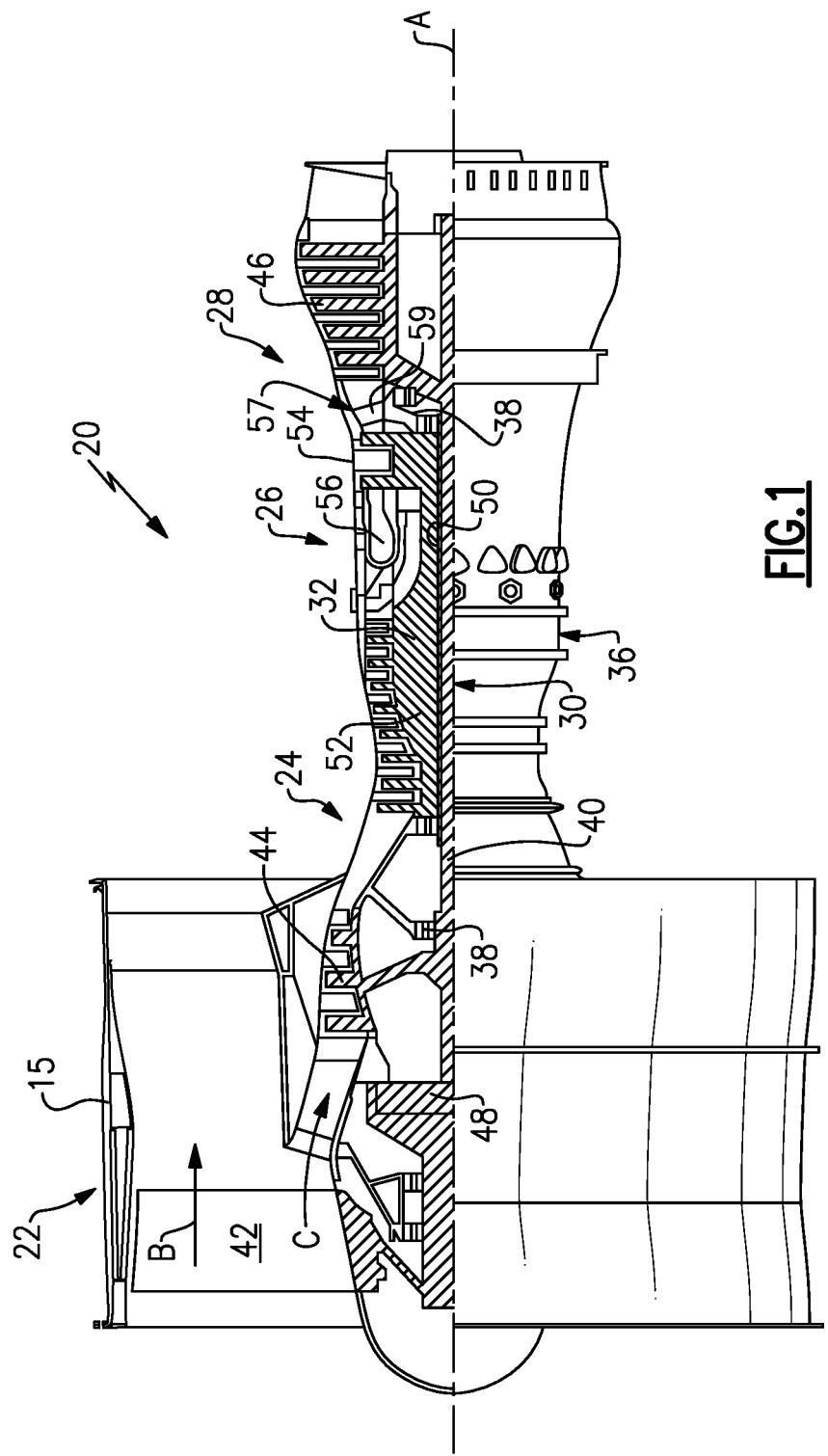
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
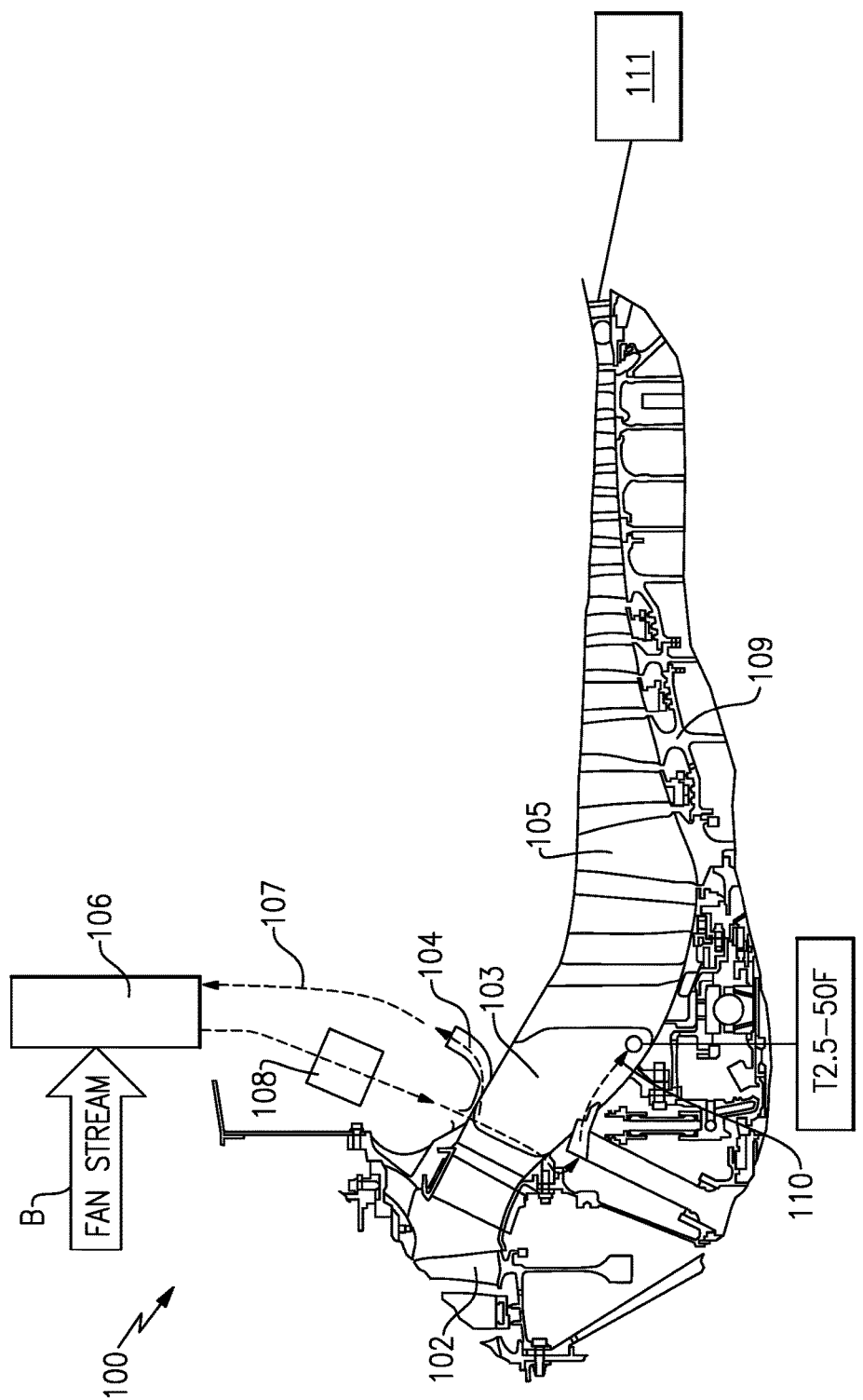
FIG. 2A shows a portion of an embodiment of a compressor section.

A compressor section 100 is illustrated in FIG. 2A. As shown, a last stage 102 of a low pressure compressor, such as the low pressure compressor 44 in FIG. 1, delivers air into a duct 103, which is positioned between the low pressure compressor and a high pressure compressor 105. A tap 104 at a radially outer location in the duct 103 taps compressed air from the low pressure compressor section through a duct 107 and to a heat exchanger 106. A fan stream, such as the bypass air B, cools the air in the heat exchanger 106. A fan 108 drives that air back radially inwardly through the duct 103 (shown in dashed lines) to an outlet 110 at a radially inner location. By delivering the cooling air to the outlet 110 at the radially inner location, the hub 109 of the high pressure compressor 105 is cooled along its length. As an example, the air typically at the radially inner location is hotter than the air at the radially outer location. By cooling and delivering the air from the radially outer tap 104 to the outlet 110, the temperature at the hub 109 may be reduced by as much as 50° F. (10° C.), as an example. As is clear from FIG.2A, the outlet is within the core engine flow, and radially outward of the hub 109. As shown schematically, a tap 111 delivers this air to the turbine section. Since the air along the hub is cooler, the air being delivered as cooling air to the turbine section is also cooler.

Figure 2B:
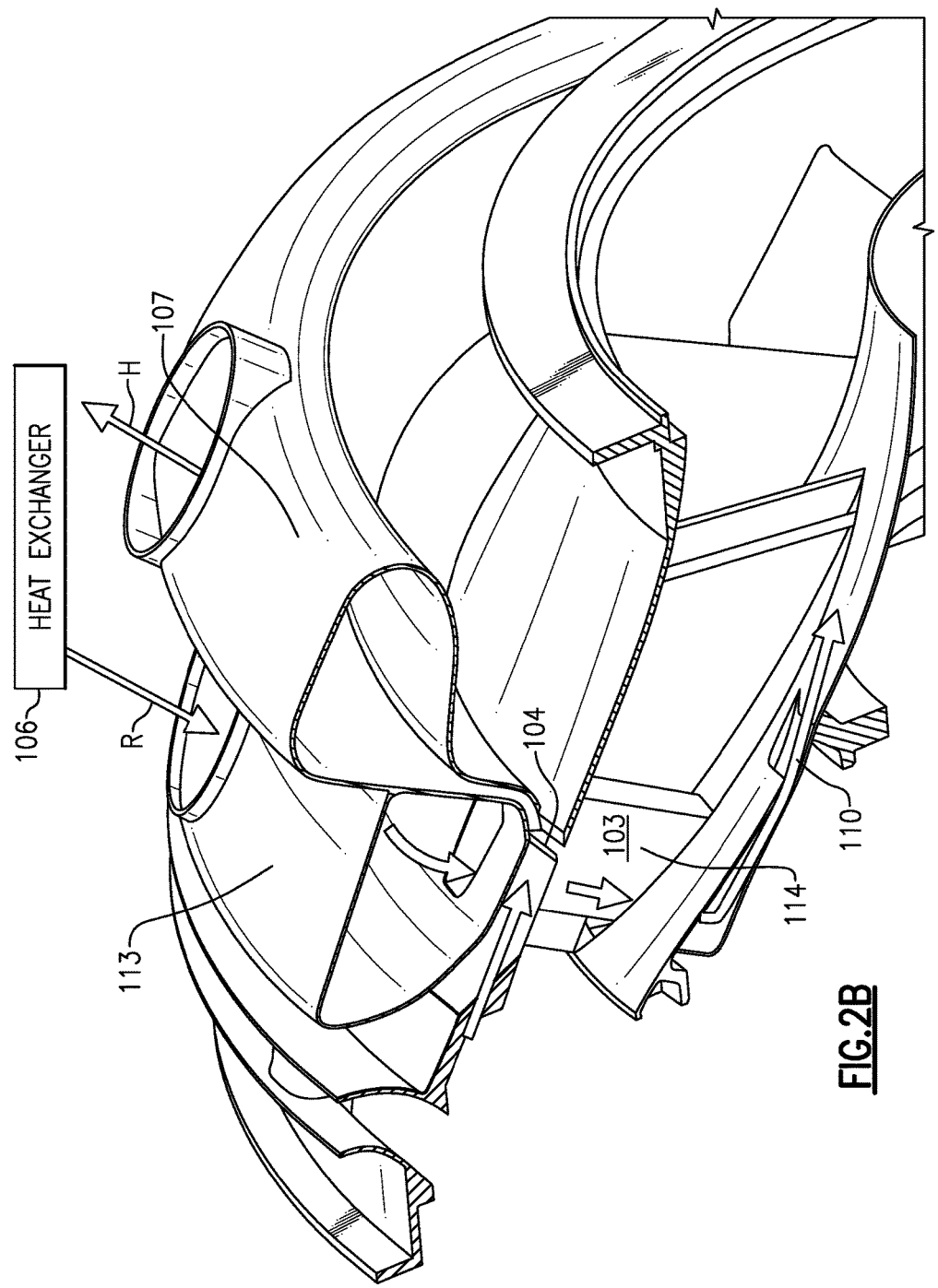
FIG. 2B shows flow structure of the compressor section of FIG. 2A.

FIG. 2B shows a detail of the outlet 110 in a vane 114. The tap 104 taps the outer diameter higher temperature air H through the heat exchanger 106, and returns air at R through a duct portion 113 into the vane 114, where it is then delivered to the outlet 110.

Figure 2C:
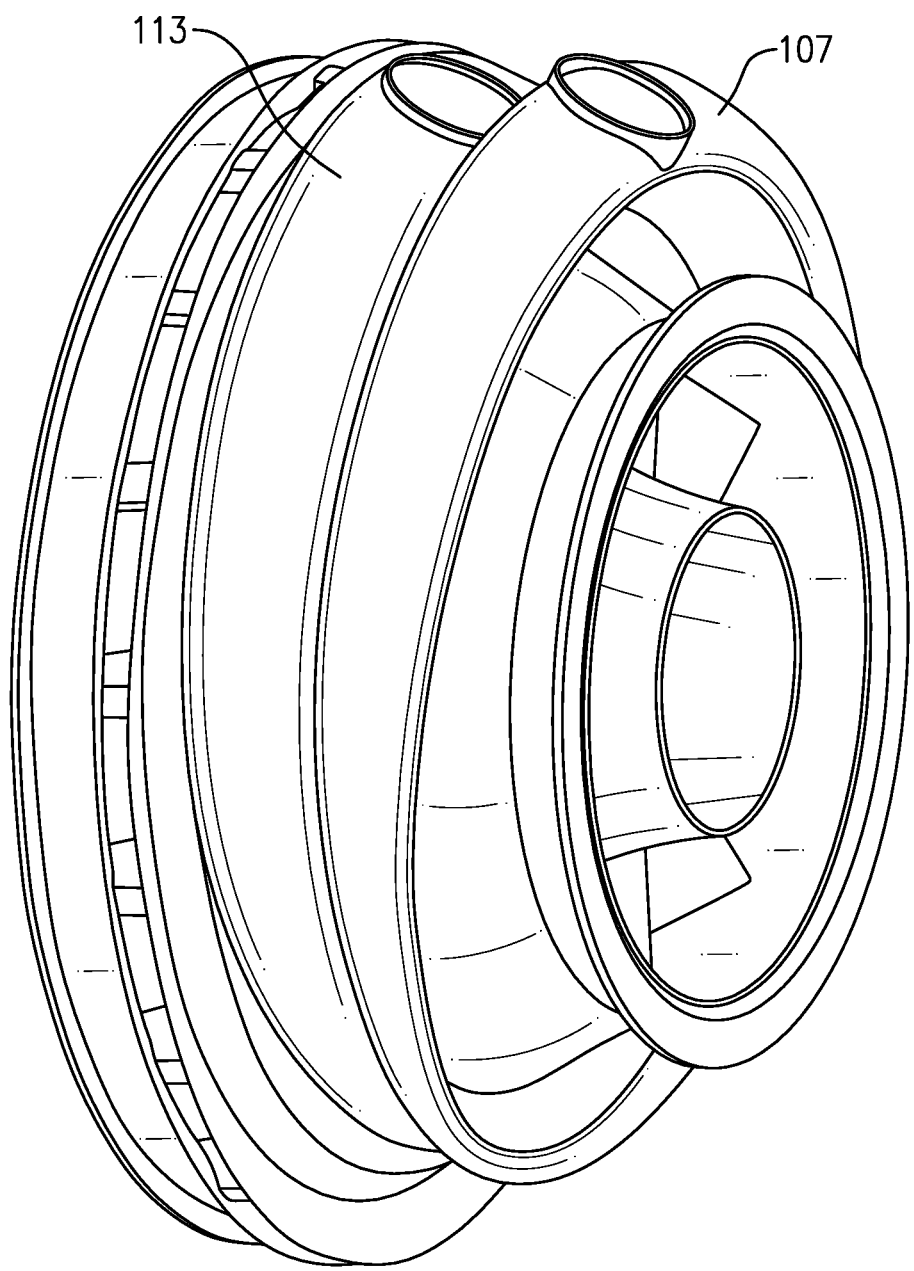
FIG. 2C is another view of the flow structure of the compressor section of FIG. 2A.

FIG. 2C shows details of the duct 113 and 107.

Figure 3:
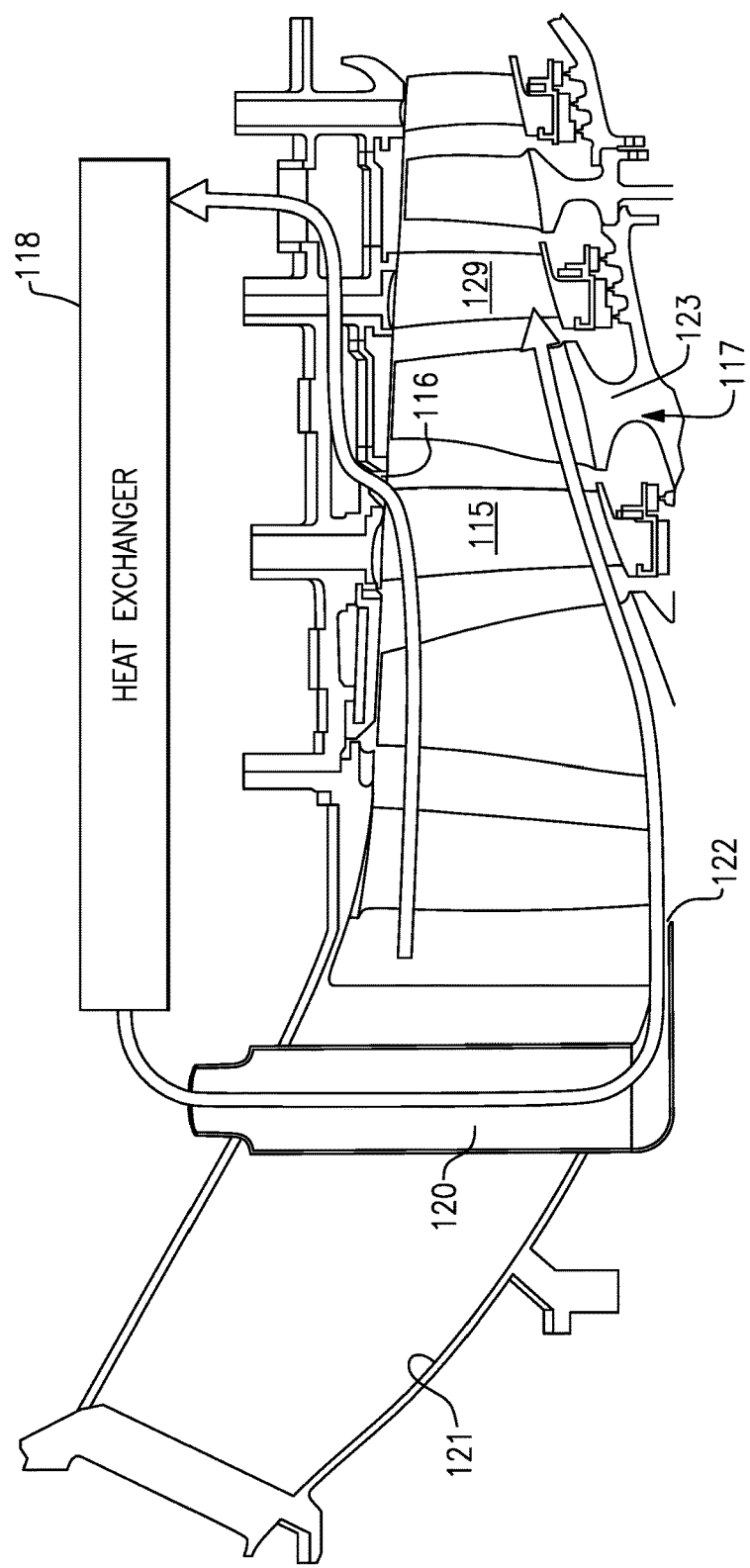
FIG. 3 shows an alternative embodiment of a compressor section.

FIG. 3 shows an embodiment wherein the air is tapped from a location in a high pressure compressor 117. The air is tapped downstream of a vane 115 through a tap 116 in the high pressure compressor section 117. The air from tap 116 passes through a heat exchanger 118, and is delivered back through a vane 120 in a duct 121 to an outlet 122 along the inner surface of the hub 123. This will provide the benefits similar to those mentioned above.

Figure 4:
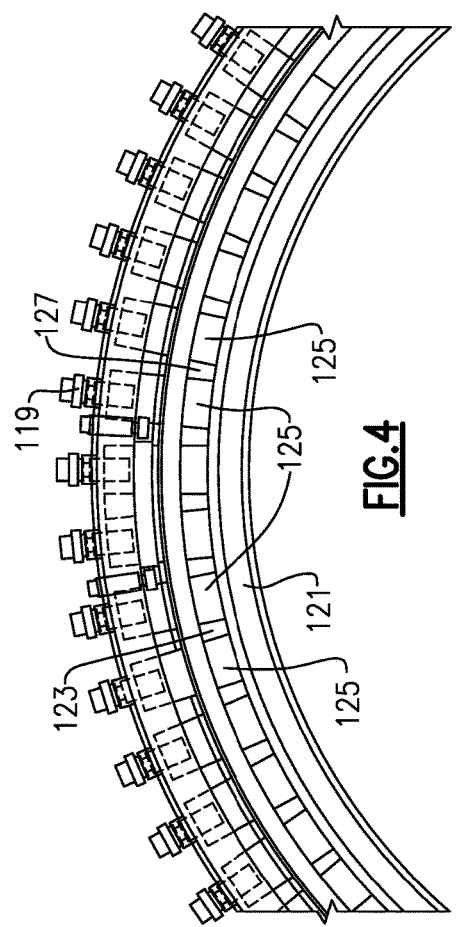
FIG. 4 shows a detail of the FIG. 3 embodiment.

FIG. 4 shows details of the FIG. 3 embodiment. As known, a plurality of vanes are within the duct 121. Outwardly of the duct 121, pivot structure 125 mounts drive actuators 119 to rotate the vanes such as the vane 115 or 129 shown in FIG. 3.

As shown, in portions of the structure, there is a solid wall 123 between adjacent pivot structures 125. At locations where the airflow from tap 116 might pass, there are open areas 127.

Figure 5:
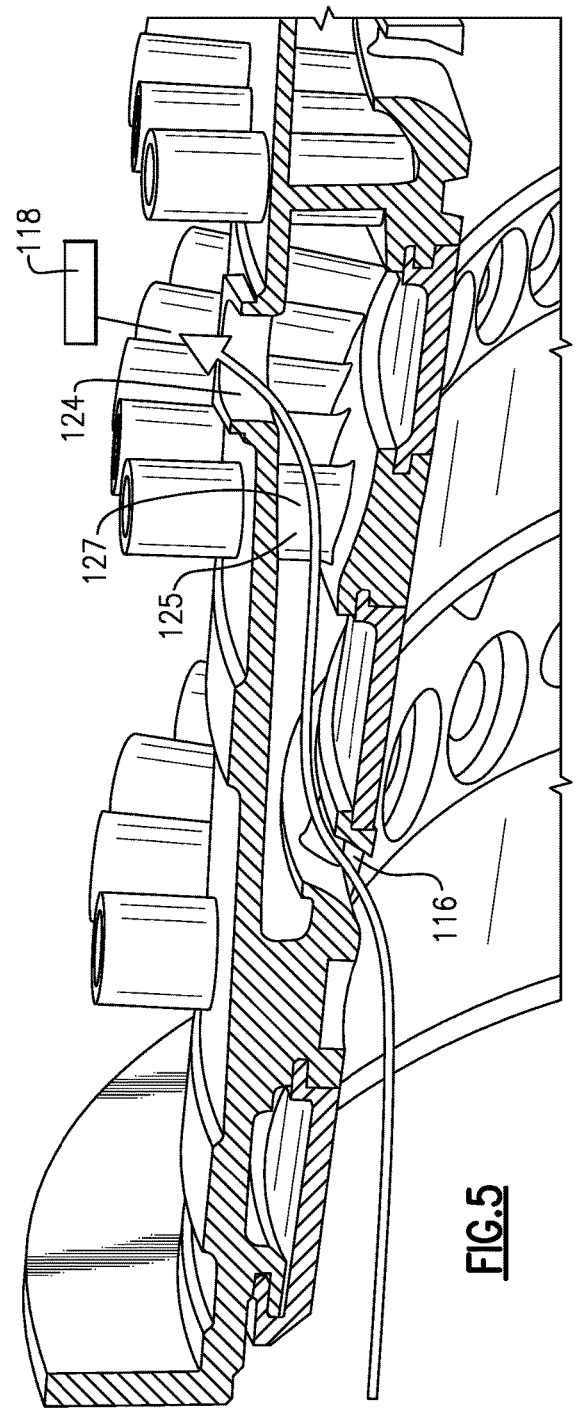
FIG. 5 shows a further detail of the FIG. 3 embodiment.

As shown in FIG. 5, the air is tapped through the tap 116 and flows through the areas 127 between adjacent pivot structures 125 to an outlet 124, which then flows through the heat exchanger 118, as mentioned above.

Figure 6:
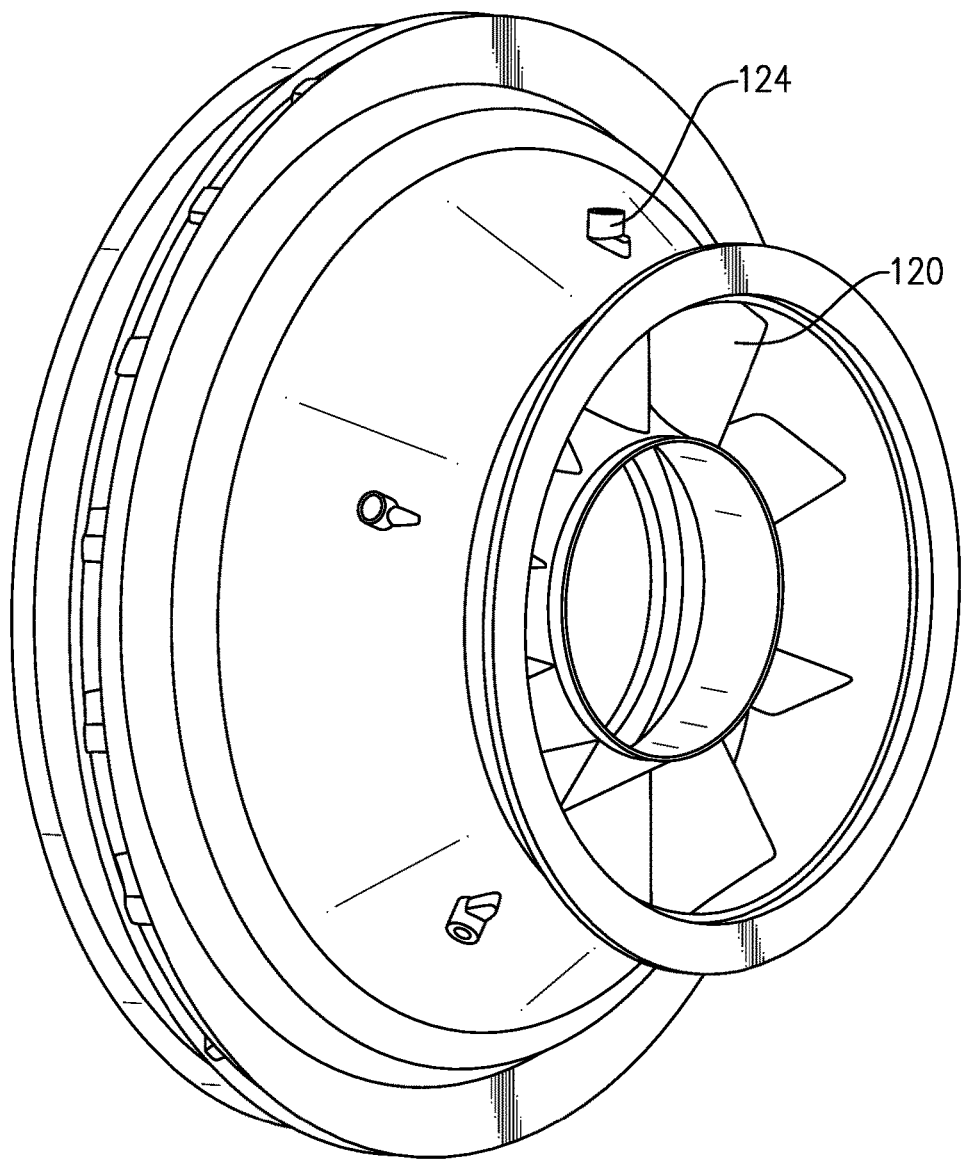
FIG. 6 shows another detail of the FIG. 3 embodiment.

FIG. 6 shows the outer structure including the vanes 120 and the outlets 124. As can be seen, there can be a plurality of circumferentially spaced outlets 124.

The high pressure compressor rotor life will be improved and the weight may be reduced. Further, since the cooler air is provided to the turbine section for cooling, the blade life of the turbine section will be improved. In addition, a compressor rear hub and a forward high pressure turbine disk arm will see reduced temperatures.

Approximately, three percent of the core flow may be tapped in the FIG. 2A or 3 embodiments as an example.

Stated another way, in both embodiments, a compressor section for use in a gas turbine engine may have a compressor rotor having a hub and a plurality of blades extending radially outwardly from the hub. An outer housing surrounds an outer periphery of the blades. A tap taps air at a radially outer first location, passes the tapped air through a heat exchanger, and returns the tapped air to an outlet at a second location which is radially inward of the first location, to provide cooling air adjacent to the hub.

The outlet may be at a location which is upstream of said tap as shown in FIG. 3, or downstream as shown in FIG. 2A.

There is a lower pressure compressor rotor and a higher pressure compressor rotor, and the tap may be within the higher pressure compressor rotor as shown in FIG. 3.

The outlet may also be in a duct that separates a high pressure compressor and a low pressure compressor as shown in FIGS. 2A and 2B.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor section for use in a gas turbine engine comprising:
   a compressor rotor having a hub and a plurality of blades extending radially outwardly from said hub and an outer housing surrounding an outer periphery of said blades;
   an annular duct upstream of the compressor rotor configured to deliver a core engine flow to the plurality of blades; and
   a tap for tapping air at a radially outer first location, passing the tapped air through a heat exchanger, and returning the tapped air to an outlet through a radially inner wall of the annular duct, the outlet at a second location which is radially inward of said first location, radially outward of said hub, and within the core engine flow, the outlet positioned to provide cooling air adjacent to said hub and passing along a radially outer surface of said hub.

2. The compressor section as set forth in claim 1, wherein said outlet is at a location which is upstream of said tap.

3. The compressor section as set forth in claim 2, wherein there is a lower pressure compressor rotor and a higher pressure compressor rotor, and said tap is within said higher pressure compressor rotor.

4. The compressor section as set forth in claim 1, wherein said outlet is at a location which is downstream of said tap.

5. The compressor section as set forth in claim 4, wherein said compressor section includes a lower pressure compressor rotor and a higher pressure compressor rotor, and said tap is taken at a location which is upstream of said higher pressure compressor rotor.

6. The compressor section as set forth in claim 1, wherein a fan drives air downstream of said heat exchanger to said outlet.

7. The compressor section as set forth in claim 6, wherein said tap is taken in the annular duct positioned intermediate a lower pressure compressor rotor and a higher pressure compressor rotor.

8. The compressor section as set for the in claim 1, wherein said tap is taken in the annular duct positioned intermediate a lower pressure compressor rotor and a higher pressure compressor rotor.

9. The compressor section as set for the in claim 8, wherein said outlet is also in said annular duct.

10. A gas turbine engine comprising:
    a compressor section;
    a combustor;
    a turbine section;
       said compressor section including a compressor rotor having a hub and a plurality of blades extending radially outwardly from said hub and an outer housing surrounding an outer periphery of said blades;
    an annular duct upstream of the compressor rotor configured to deliver a core engine flow to the plurality of blades; and
    a tap for tapping air at a radially outer first location, passing the tapped air through a heat exchanger, and returning the tapped air to an outlet through a radially inner wall of the annular duct, the outlet at a second location which is radially inward of said first location, radially outward of said hub, and within the core engine flow, the outlet positioned to provide cooling air adjacent to said hub and passing along a radially outer surface of said hub.

11. The gas turbine engine as set forth in claim 10, wherein said outlet is at a location which is upstream of said tap.

12. The gas turbine engine as set forth in claim 11, wherein there is a lower pressure compressor rotor and a higher pressure compressor rotor, and said tap is within said high pressure compressor rotor.

13. The gas turbine engine as set forth in claim 10, wherein said outlet is at a location which is downstream of said tap.

14. The gas turbine engine as set forth in claim 13, wherein said compressor section includes a lower pressure compressor rotor and a higher pressure compressor rotor, and said tap is taken at a location which is upstream of said higher pressure compressor rotor.

15. The gas turbine engine as set forth in claim 10, wherein a fan drives air downstream of said heat exchanger to said outlet.

16. The compressor section as set forth in claim 15, wherein said tap is taken in the annular duct positioned intermediate a lower pressure compressor rotor and a higher pressure compressor rotor.

17. The compressor section as set for the in claim 10, wherein said tap is taken in the annular duct positioned intermediate a lower pressure compressor rotor and a higher pressure compressor rotor.

18. The compressor section as set for the in claim 17, wherein said outlet is also in said annular duct.

\* \* \* \* \*